(12) United States Patent
Stein et al.

(10) Patent No.: US 6,334,409 B1
(45) Date of Patent: Jan. 1, 2002

(54) ANIMAL HARNESS

(75) Inventors: John William Stein, Allentown, PA (US); Stuart Fielding, Morris Plains, NJ (US)

(73) Assignee: Bio-Enhancement Systems Corporation, Morris Plains, NJ (US)

( * ) Notice: Subject to any disclaimer, the term of this patent is extended or adjusted under 35 U.S.C. 154(b) by 0 days.

(21) Appl. No.: 09/568,013

(22) Filed: May 10, 2000

Related U.S. Application Data

(60) Provisional application No. 60/186,360, filed on Mar. 21, 2000.

(51) Int. Cl.[7] ................................................. B68B 5/00
(52) U.S. Cl. ......................... 119/858; 119/811; 54/78; 54/23
(58) Field of Search ........................... 54/4, 23, 35, 78; 119/811, 856, 858

(56) References Cited

U.S. PATENT DOCUMENTS

| | | | | |
|---|---|---|---|---|
| 1,140,186 A | * | 5/1915 | Quick | 119/811 |
| 2,740,380 A | * | 4/1956 | Johnson | 119/811 |
| 4,141,197 A | * | 2/1979 | Nichols | 54/78 X |
| 5,205,238 A | | 4/1993 | Boice | |
| 5,845,606 A | * | 12/1998 | Hartman | 119/856 |

* cited by examiner

*Primary Examiner*—Robert P. Swiatek
(74) *Attorney, Agent, or Firm*—Nixon & Vanderhye PC; Frank P. Presta

(57) ABSTRACT

A harness apparatus for mounting a device on the outside of the tail of an animal, comprising a girth belt constructed to surround the body of the animal near the front legs thereof, the girth belt having a rearwardly extending belt portion positioned to be located near the spinal portion of the animal. A tail harness comprising a first flexible and resilient cord is connected at its forward end to the rear end of the girth belt portion. A second flexible and resilient cord having a first loop at its front end is connected to the rear end of the first cord, the second cord having two cord portions that extend rearwardly from the first loop and are constructed to extend around and under the tail of the animal. An adjustment device is mounted on the second cord portions near the rear end of the first loop to maintain them in closely adjacent relation. The adjustment device is slidable along the second cord portions and is positioned to be located in front of the tail of the animal. The second cord portions diverge rearwardly from the adjustment device to form a second loop positioned to surround the tail of the animal. A connecting device maintains the second cord portions in closely adjacent relation at the rear end of the second loop, and is positioned to be located under the tail of the animal. The second cord portions diverge rearwardly from the second loop and terminate in end portions adapted to be adjustably connected to the device to be mounted on the outside of the tail of the animal.

19 Claims, 3 Drawing Sheets

ANIMAL HARNESS

CROSS REFERENCE TO RELATED APPLICATION

This application claims the benefit of U.S. Provisional Application Ser. No. 60/186360, filed Mar. 21, 2000.

BACKGROUND OF THE INVENTION

The present application relates to a harness for mounting a device, such as the pressure or stress-applying apparatus disclosed in U.S. Pat. No. 5,205,238, on the tail of an animal.

Previously and presently used harnesses, belts or other means for mounting a device on an animal's tail have been subject to one or more of the following disadvantages:

1. They have not been strong or flexible enough to retain the device in place on the animal's tail when the animal moves its tail, rolls on the ground, rubs its rear end on fences or the like, is mounted or otherwise moves;
2. They have been complicated in construction and expensive to manufacture;
3. They have not been durable;
4. They have rubbed on the animal's adjacent body portions during movement of the animal to cause tail damage, skin damage or inflammation of such body portions;
5. They have caused excessive pressure on the animal's adjacent body portions during sleep or movement of the animal.

The new and improved animal harness of the present invention is not subject to the above-listed disadvantages and possesses certain advantages that are not present in previously or presently used harnesses, belts or other mounting means.

SUMMARY OF THE INVENTION

The animal harness apparatus of the present invention comprises two major components—the girth harness and the tail harness. The girth harness includes an adjustable belt that surrounds the forward part of the animal's body just behind the front legs thereof and in front of the animal's enlarged mid or stomach portion. A belt portion extends rearwardly from the adjustable belt along the upper or spinal portion of the animal and is constructed to be connected to the tail harness.

The tail harness comprises a first flexible and resilient cord in the nature of a bungee or the like which terminates at its forward end in a buckle or other connecting device constructed to be removably connected to the adjacent rear end of the belt portion of the girth harness. The rear end of the first cord is connected to the loop of a second flexible and resilient cord in the nature of a bungee or the like which extends rearwardly around both sides of the animal's tail and beneath the tail where its two portions are joined by a staple, clamp or other suitable connecting means. The two portions of the second cord extend rearwardly and laterally outwardly from the connecting means where their ends are adjustably connected to a device positioned on the outside of the tail on both sides thereof to retain the device on the tail and to vary the distance between the staple, clamp or other connecting means and the device to accommodate tails of different sizes.

The forward looped portion of the second cord extends through adjustment means such as an eyelet or the like that can be moved along the second cord to control the point at which the two portions thereof diverge so that it is near the beginning of the tail of the animal. Preferably, the first cord is more flexible than the second cord of the tail harness to allow for easy elongation of the first cord when the animal lies down, is mounted or otherwise moves to stretch the first cord.

The provision of the connecting means on the two portions of the second cord beneath the animal's tail helps to prevent the second cord portions from contacting the adjacent underside of the tail in front of the connecting means, thereby preventing irritation of the delicate underside of the tail. The second cord has sufficient stiffness to form a "V" configuration around the right and left side of the root of the tail with the connecting means to prevent contact with the crotch of the underside of the tail.

Appropriate portions of the girth harness and tail harness may be padded to protect the adjacent skin of the animal.

DESCRIPTION OF THE PREFERRED EMBODIMENTS

Figure 1:
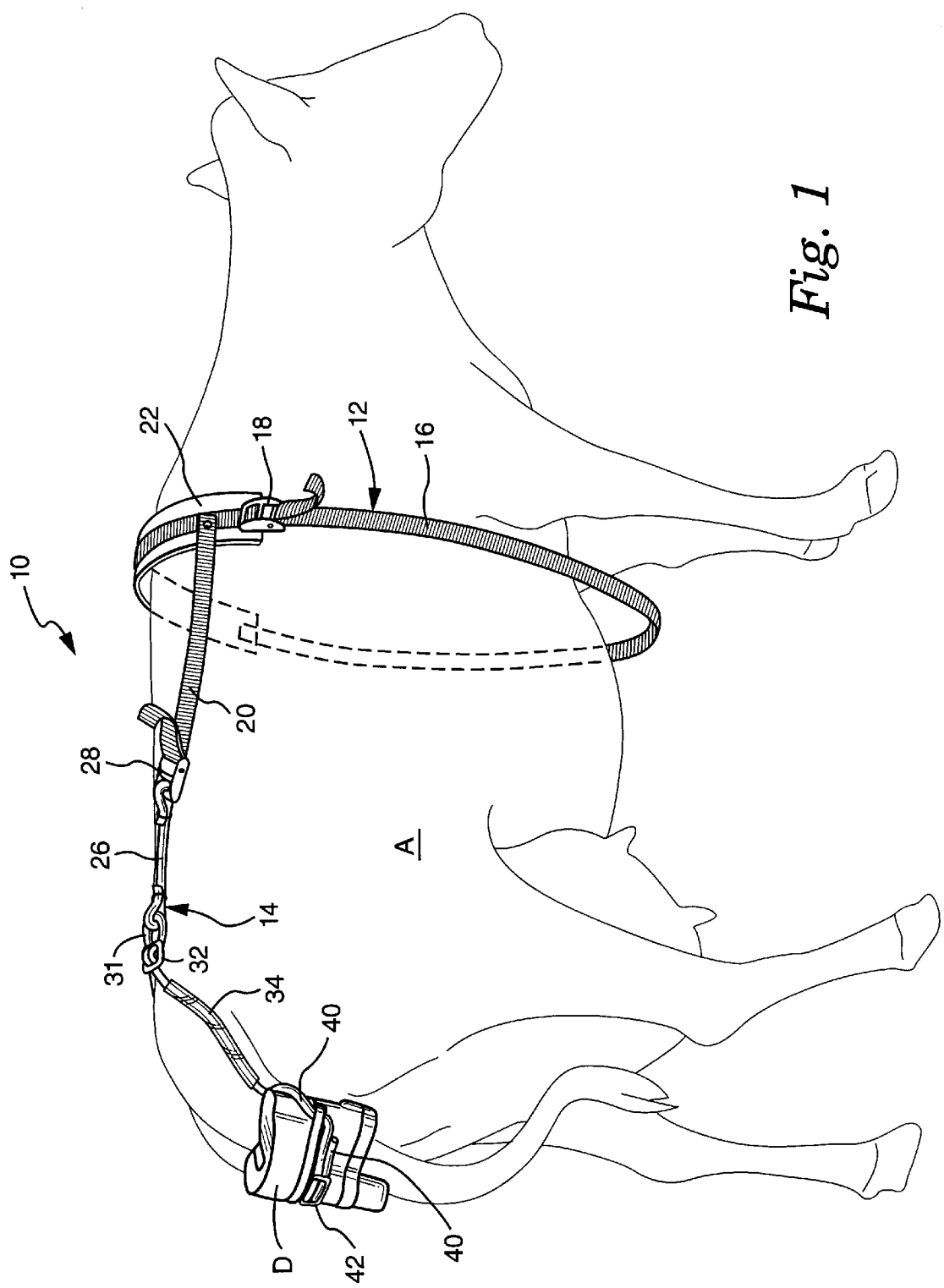
FIG. 1 is a perspective view of the animal harness apparatus of the present invention mounted on an animal.

As shown in FIG. 1, the animal harness apparatus 10 of the present invention comprises two major components, the girth harness 12 and the tail harness 14. The girth harness 12 includes an adjustable belt that surrounds the forward part of the body of the animal A just behind the front legs thereof and in front of the animal's enlarged mid or stomach portion. The belt 16 is provided with a buckle 18 or other suitable means for enabling it to be tightened around and retained in position on the animal's body. A belt portion 20 extends rearwardly from the adjustable belt 16 along the upper or spinal portion of the animal for connection to the tail harness 14 in a manner to be described hereinafter. The adjustable belt 16 may be provided with one or more pads 22 to prevent irritation to the animal's skin.

Figure 2:
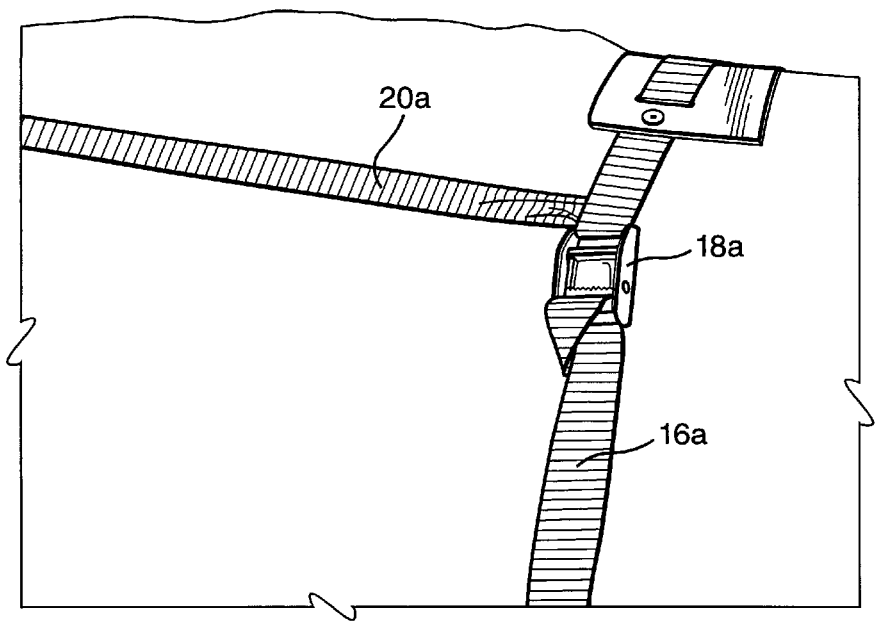
FIG. 2 is a side-elevational view showing a portion of a second embodiment of the girth harness of the present invention.
Figure 3:
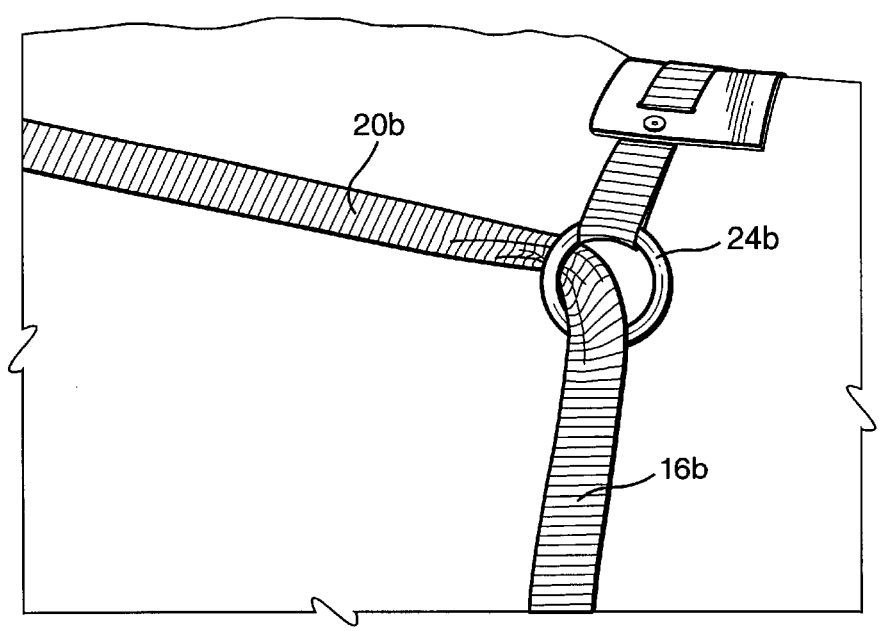
FIG. 3 is a side-elevational view showing a third embodiment of the girth harness of the present invention.

FIGS. 2 and 3 illustrate modified embodiments of the girth harness 12. In FIG. 2, the belt portion 20a is an extension of the adjustable belt 16a and is looped around the buckle 18a and through a loop (not shown) at an end portion of the adjustable belt connected to the buckle. In FIG. 3, the adjustable belt 16b is provided with a ring 24b at one end thereof through which the belt extends to form the rearwardly extending belt portion 20b. In the case of a wide belt 16b, the ring 24b may be formed in a "D" shape with the straight portion thereof supporting the belt as it extends rearwardly into the belt portion 20b. The embodiment shown in FIG. 3 is advantageous in that it allows the girth harness 12 to expand in diameter when the animal lies down and its body diameter increases, thereby reducing pressure on the animal's spine which could cause compression sores or the like.

Figure 4:
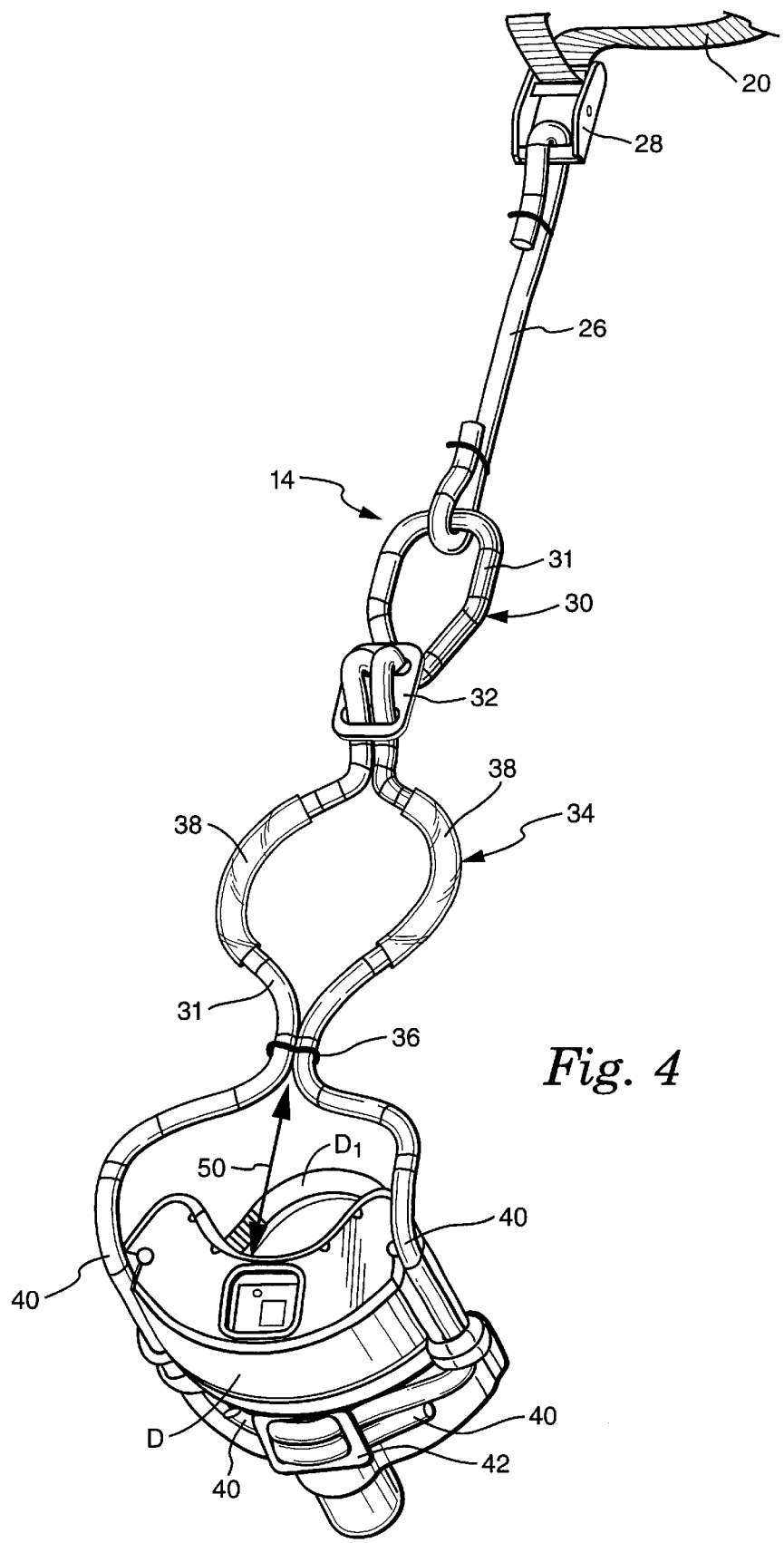
FIG. 4 is a perspective view of the tail harness of the present invention.

Referring to FIGS. 1 and 4, the tail harness 14 comprises a first flexible and resilient cord 26 formed of any suitable, durable material, such as a bungee or the like, which is connected at its forward end to a buckle 28 or other suitable connecting device to which the rear end of the belt portion 20 of the girth harness may be adjustably and removably connected. The opposite or rear end of the first cord 26 is connected to the forward or first loop 30 of a second flexible and resilient cord 31 formed of a suitable, durable material, such as a bungee or the like. The second cord portions extend rearwardly from the first loop 30 through a first adjustment means 32 that can be moved along the second cord portions to control the point at which they rearwardly diverge so that it is near the beginning of the tail of the animal, as shown in FIG. 1. The first adjustment means 32 may be of any suitable construction. As shown in the embodiment of FIG. 4, it is in the form of a first eyelet member with two spaced openings through which the second cord portions slidably extend.

The second cord portions extend rearwardly and outwardly from the first adjustment means 32 to form a rear or second loop 34 that extends around and under the animal's tail in the manner shown in FIG. 1. At the rear end of the second loop 34, the second cord portions are joined by a suitable connecting means 36, such as a clamp, staple, ferrule or the like, located under the animal's tail. The portions of the second cord in the second loop 34 may be provided with pads 38 for the purpose of avoiding irritation to the animal's tail during movement thereof.

The two portions of the second cord 31 extend rearwardly and laterally outwardly from the connecting means 36 around the tail of the animal A where their ends 40 are connected to a device D positioned on the outside of the tail on both sides thereof to retain the device on the tail. As shown in FIG. 4, the device D may be provided with a portion $D_1$ that extends around the tail. Preferably, the ends 40 of the second cord portions extend through adjacent portions of the device D and then through a second adjustment means 42 of any suitable construction, such as the second eyelet member as shown in FIG. 4. The second eyelet member 42 may have two spaced openings like the first eyelet member 32. By adjusting the positions of the ends 40 of the second cord portions in the second eyelet member 42, the distance 50 between the connecting means 36 and the device D can be varied to accommodate tails of different sizes.

Preferably, the first cord 26 of the tail harness 14 is more flexible than the second cord 31 to allow for easy elongation of the first cord 26 when the animal lies down or otherwise moves to stretch the first cord. The provision of the connecting means 36 on the two portions of the second cord 31 beneath the animal's tail helps to prevent the second cord portions from contacting the adjacent underside of the tail in front of the connecting means to prevent irritation of the delicate underside of the tail. The second cord 31 has sufficient stiffness to form a "V" configuration around both sides of the root of the tail with the connecting means 36 to prevent contact with the crotch of the underside of the tail.

From the foregoing description, it is apparent that the animal harness apparatus of the present invention provides a simple and effective means for mounting the device D on the outside of the tail of the animal A which minimizes stress and irritation of the animal and allows it to move freely without adversely affecting the mounting of the device D on the tail thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Harness apparatus for mounting a device on the outside of the tail of an animal, comprising:
    a girth belt constructed to surround the body of the animal near the front legs thereof, said girth belt having a rearwardly extending belt portion positioned to be located near the spinal portion of the animal;
    a tail harness comprising a first flexible and resilient cord connected at its forward end to the rear end of said girth belt portion, and a second flexible and resilient cord having a first loop at its front end that is connected to the rear end of said first cord, said second cord having two cord portions that extend rearwardly from said first loop and are constructed to extend around and under the tail of the animal;
    first adjustment means mounted on said second cord portions near the rear end of said first loop to maintain them in closely adjacent relation, said first adjustment means being slidable along said second cord portions and being positioned to be located in front of the tail of the animal, said second cord portions diverging rearwardly from said adjustment means to form a second loop positioned to surround the tail of the animal; and
    connecting means for maintaining said second cord portions in closely adjacent relation at the rear end of said second loop, said connecting means being positioned to be located under the tail of the animal;
    said second cord portions diverging rearwardly from said second loop and terminating in end portions adapted to be connected to the device to be mounted on the outside of the tail of the animal.

2. The harness of claim 1 wherein said girth belt is adjustable to conform to the body of an animal on which it is mounted.

3. The harness of claim 2 wherein said girth belt comprises a buckle for releasably gripping said girth belt in a desired position.

4. The harness of claim 3 wherein said girth belt portion extends rearwardly from a position near said buckle.

5. The harness of claim 2 wherein said girth belt comprises a ring on one end thereof through which said girth belt extends, and said girth belt portion extends rearwardly from said ring.

6. The harness of claim 1 wherein said first cord is more flexible than said second cord.

7. The harness of claim 1 wherein said first adjustment means is an eyelet member having an aperture through which said second cord portions extend.

8. The harness of claim 7 wherein said eyelet member is a plate member having spaced apertures through which said second cord members extend.

9. The harness of claim 1 wherein said connecting means is a clamp.

10. The harness of claim 1 wherein said connecting means is a staple.

11. The harness of claim 1 wherein said connecting means is a ferrule.

12. The harness of claim 1 wherein said second cord is of limited flexibility such that it maintains a generally "V" configuration in the area where said second cord portions are adapted to extend around the tail of an animal to said connecting means, thereby providing for limited contact with the underside of an animal's tail when mounted thereon.

13. The harness of claim 1 wherein said first and second cords are bungee cords.

14. The harness of claim 1 wherein said girth belt is padded.

15. The harness of claim 1 wherein said girth belt is padded in the area where it is adapted to contact the upper or spinal portion of the animal.

16. The harness of claim 1 wherein said second cord portions are padded in the area of said second loop.

17. The harness of claim 1 wherein the end portions of said second cord portions extend through a second adjustment means for the purpose of adjusting the distance between said connecting means and the device to be mounted on the animal's tail to accommodate tails of different sizes.

18. The harness of claim 17 wherein said second adjustment means is an eyelet member having an aperture through which said second cord end portions extend.

19. The harness of claim 18 wherein said eyelet member is a plate member having spaced apertures through which said second cord end portions extend.

* * * * *